United States Patent

Fujimoto et al.

Patent Number: 5,591,905
Date of Patent: Jan. 7, 1997

[54] DETERIORATION DETECTING APPARATUS FOR CATALYTIC CONVERTER

[75] Inventors: Shinya Fujimoto; Hirofumi Ohuchi, both of Hyogo, Japan

[73] Assignee: Mitsubishi Denki Kabushiki Kaisha, Tokyo, Japan

[21] Appl. No.: 524,169

[22] Filed: Aug. 31, 1995

Related U.S. Application Data

[63] Continuation of Ser. No. 253,166, Jun. 2, 1994, abandoned.

[30] Foreign Application Priority Data

Feb. 15, 1994 [JP] Japan .................................. 6-018717

[51] Int. Cl.$^6$ ................................................. G01M 15/00
[52] U.S. Cl. ............................................. 73/118.1; 60/277
[58] Field of Search ................................. 73/116, 118.1, 73/118.2; 60/277, 285, 286, 276, 284

[56] References Cited

U.S. PATENT DOCUMENTS

| | | | |
|---|---|---|---|
| 3,837,165 | 9/1974 | Arrigoni et al. | 60/277 |
| 3,939,654 | 2/1976 | Creps | 60/276 |
| 3,949,551 | 4/1976 | Eichler et al. | 60/274 |
| 3,969,932 | 7/1976 | Rieger et al. | 73/118.1 |
| 4,884,066 | 11/1989 | Miyata et al. | 73/118.1 |
| 4,966,036 | 10/1990 | Woersinger | 73/118.2 |
| 5,060,473 | 10/1991 | Nakagawa | 60/277 |
| 5,267,472 | 12/1993 | Schneider et al. | 73/118.1 |
| 5,280,707 | 1/1994 | Nakashima et al. | 60/276 |
| 5,337,556 | 8/1994 | Aihara | 60/276 |

OTHER PUBLICATIONS

U.S. Ser. No. 07/946,532, Filed Sep. 17, 1992, Group Art Unit 3406.

Primary Examiner—Richard Chilcot
Assistant Examiner—Eric S. McCall
Attorney, Agent, or Firm—Sughrue, Mion, Zinn, Macpeak & Seas

[57] ABSTRACT

A deterioration detecting apparatus for catalytic converter is provided to surely detect deterioration of a catalytic converter. In the deterioration detecting apparatus for catalytic converter, an electronic control unit decides whether or not a catalyst is activated in the catalytic converter for removing injurious ingredients from an exhaust gas of an engine, and the electronic control unit decides the deterioration of the catalyst only when it decides that the catalyst is activated. It is thereby possible to avoid erroneous decision of the deterioration since the deterioration of the catalyst is not decided when the catalytic converter is not activated.

8 Claims, 11 Drawing Sheets

DETERIORATION DETECTING APPARATUS FOR CATALYTIC CONVERTER

This is a continuation of application No. 08/253,166 filed Jun. 2, 1994, abandoned Aug. 31, 1995.

BACKGROUND OF THE INVENTION

1. Field of the Invention

The present invention relates to a deterioration detecting apparatus for a catalytic converter which purifies an exhaust gas from an internal combustion engine (hereinafter referred to as engine).

2. Description of the Prior Art

Conventionally, an exhaust gas from an engine has been purified by using a catalytic converter employing a three way catalyst to concurrently remove HC, CO, and $NO_x$ serving as injurious ingredients in the exhaust gas. Since a combustion efficiency of the engine is varied depending upon an air-fuel ratio of a mixture inhaled into the engine, feed back control of air-fuel ratio is carried out such that the air-fuel ratio becomes the optimal value (of, for example, 14.7) according to an operating state. In the feed back control, an air-fuel ratio sensor such as oxygen sensor has been conventionally mounted in an exhaust pipe of the engine at a position in the upstream of the catalytic converter, for example, at a portion of collected exhaust pipe manifolds, and the air-fuel ratio sensor has outputted a signal to carry out the feed back control of air-fuel ratio (hereinafter referred to as single air-fuel ratio sensor system).

However, since only one air-fuel ratio is provided in the single air-fuel ratio sensor system, variations in an output characteristic of the air-fuel ratio result in deterioration of control accuracy. Thus, it is necessary to compensate for the variations in the output characteristic of the air-fuel ratio sensor, and variations and time elapsing variations in parts such as fuel injection valve of the engine. For this purpose, there is proposed another control system (hereinafter referred to as double air-fuel ratio sensor system) in which a second air-fuel ratio sensor is mounted in the downstream of the catalytic converter to carry out double feed back of air-fuel ratio together with the upstream air-fuel ratio sensor (see, for example, U.S. Pat. No. 3,939,654).

For the following reasons, the double air-fuel sensor system has advantages in that a little variation is generated in the output characteristic of the air-fuel sensor in the downstream of the catalytic converter, and stable air-fuel ratio feed back control can be established.

(1) In the downstream of the catalytic converter, a low exhaust temperature can reduce a thermal effect.

(2) In the downstream of the catalytic converter, the catalyst can remove various injurious materials, resulting in less poisoning of the air-fuel sensor.

(3) In the downstream of the catalytic converter, the exhaust gas is sufficiently mixed, and an oxygen concentration in the exhaust gas has a value in a substantially equilibrium state.

A catalyst of the catalytic converter is designed so as to avoid considerable reduction of a function of the catalyst as far as a vehicle is used under a normal working condition. However, the function of the catalyst may be considerably reduced in case a user of the vehicle erroneously uses leaded gasoline as fuel, or in case a high tension cord is slipped off for some reason during operation of the vehicle to cause incapability of ignition. In the former case, the user never finds the error, and in the latter case, the user can drive the vehicle by simply correctly inserting the high tension cord. Therefore, the user frequently drives the vehicle without exchanging the catalyst so that the vehicle is running in a state where the deteriorated catalytic converter can not purify the exhaust gas.

In the double air-fuel ratio sensor system, when the function of the catalyst is deteriorated, an unburnt gas such as HC, CO, or $H_2$ is exhausted downstream. Consequently, the downstream air-fuel ratio sensor is affected, and the output characteristic may be varied. As a result, there are problems of deterioration of fuel consumption, deterioration of driverbility, or deterioration of emission of HC, CO, and $NO_x$.

Figure 1:
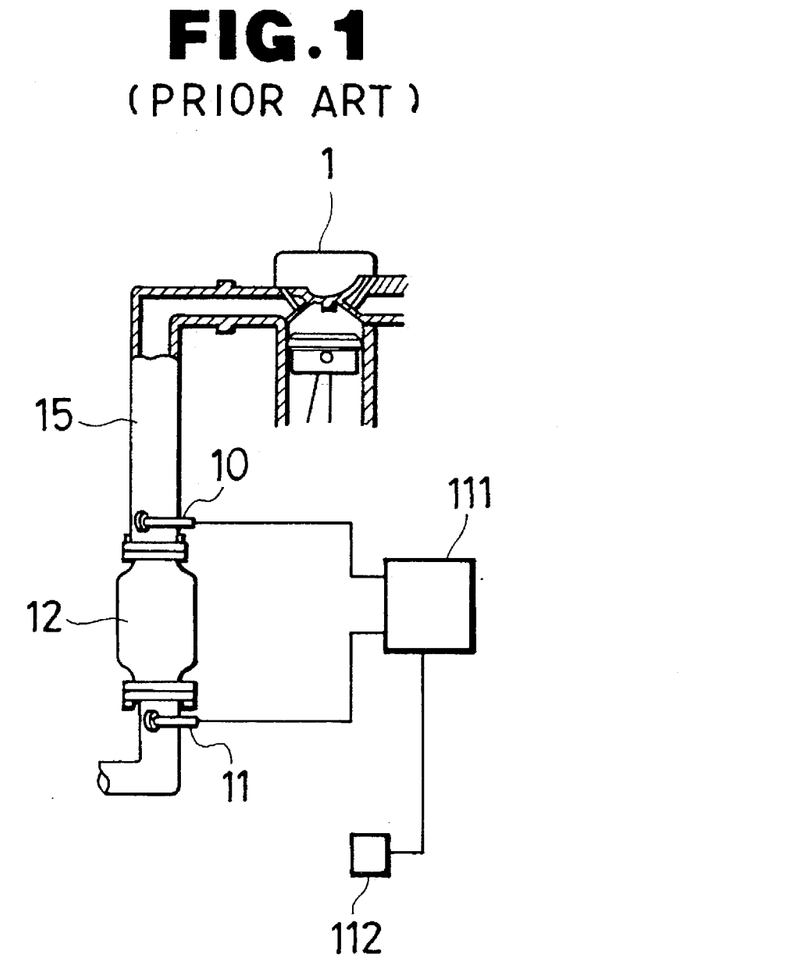
FIG. 1 is a structural diagram showing a partial structure of a conventional deterioration detecting apparatus for catalytic converter.

Hence, there is proposed a deterioration detecting apparatus for catalytic converter to detect deterioration of the catalytic converter. For example, FIG. 1 is a diagram showing a conventional deterioration detecting apparatus for catalytic converter disclosed in Japanese Patent Publication (Kokai) No. 5-98949. In FIG. 1, reference numeral 1 designate an engine, 15 designates an exhaust pipe to discharge an exhaust gas from the engine 1, 12 is the catalytic converter containing the three way catalyst to concurrently purify the injurious ingredients such as HC, CO, $NO_x$, in the exhaust gas, 10 is a first air-fuel ratio sensor mounted in the upstream of the catalytic converter 12 to generate an air-fuel ratio signal $V_1$ according to the oxygen concentration in the exhaust gas, 11 is a second air-fuel ratio sensor mounted in the downstream of the catalytic converter 12 to generate an air-fuel ratio signal $V_2$ according to the oxygen concentration in the exhaust gas, 111 is a catalyst deterioration detecting apparatus to detect deterioration of the catalyst in the catalytic converter 12, and 112 is alarm means for alerting when the catalyst is deteriorated.

A description will now be given of the operation. In the deterioration detecting apparatus for catalytic converter, the catalyst deterioration detecting apparatus 111 computes, for each of the air-fuel ratio sensors 10, 11, an area corresponding value S formed by the air-fuel ratio signals $V_1$, $V_2$ which are output voltage values from the air-fuel ratio sensors 10 and 11 mounted in the upstream and the downstream of the catalytic converter 12, and a predetermined voltage value. The catalyst deterioration detecting apparatus 111 computes, for each of the air-fuel ratio sensors 10 and 11, an inversion period T for which the output voltage value is inverted with respect to the predetermined voltage value. Further, the catalyst deterioration detecting apparatus 111 computes a catalyst deterioration deciding parameter by using the area corresponding value S and the inversion period T, or by combining both of them. The deterioration deciding parameter is compared with a predetermined value to decide whether or not the catalyst is deteriorated. When it is decided that the catalyst is deteriorated, the alarm means 112 alerts.

The conventional deterioration detecting apparatus for catalytic converter is provided as set forth above. Accordingly, there is a problem in that, when the catalyst is not sufficiently activated, decision of deterioration may be erroneously made even if the catalyst is not deteriorated.

SUMMARY OF THE INVENTION

In view of the foregoing, it is an object of the present invention to provide a deterioration detecting apparatus for catalytic converter which, makes a decision of deterioration of the catalyst, only when the catalyst is activated and enables accurate decision of deterioration of the catalyst.

It is another object of the present invention to provide a deterioration detecting apparatus for catalytic converter which easily and accurately decides activation of a catalytic converter depending upon a temperature of the catalytic converter, and enables accurate decision of deterioration of the catalyst.

It is still another object of the present invention to provide a deterioration detecting apparatus for catalytic converter which easily and accurately decides activation of a catalytic converter depending upon an operating state of an engine, and enables accurate decision of deterioration of the catalyst.

According to the first aspect of the present invention, for achieving the above-mentioned objects, there is provided a deterioration detecting apparatus for catalytic converter including catalyst activation deciding means for basically deciding whether or not a catalyst in a catalytic converter is activated, and catalyst deterioration deciding means for deciding deterioration of the catalyst only when the catalyst activation deciding means decides that the catalyst is activated.

As stated above, in the deterioration detecting apparatus for catalytic converter according to the first aspect of the present invention, the catalyst activation deciding means decides whether or not the catalyst in the catalytic converter is activated, and the catalyst deterioration deciding means decides the deterioration of the catalyst only when the catalyst is activated. Therefore, it is possible to provide accurate decision of deterioration of the catalyst.

According to the second aspect of the present invention, there is provided a deterioration detecting apparatus for catalytic converter including temperature detecting means for detecting a temperature of a catalytic converter, and the catalyst activation deciding means for deciding that the catalyst converter is activated when an output value from the temperature detecting means falls in a predetermined range.

As stated above, in the deterioration detecting apparatus for catalytic converter according to the second aspect of the present invention, the temperature detecting means detects the temperature of the catalytic converter, and it is decided that the catalytic converter is activated when the temperature of the catalytic converter falls in the predetermined range. Therefore, it is possible to easily and accurately decide activation of the catalytic converter, and provide accurate decision of the deterioration of the catalyst.

According to the third aspect of the present invention, there is provided a deterioration detecting apparatus for catalytic converter including operating state detecting means for detecting an operating state of an engine, and the catalyst activation deciding means for deciding that the catalytic converter is activated for a period from a time after elapse of a predetermined time in which an output value from the operating state detecting means is kept in a predetermined range, to another time after a predetermined time after the output value is out of the predetermined range.

As stated above, in the deterioration detecting apparatus for catalytic converter according to the third aspect of the present invention, the operating state detecting means detects the operating state of the engine, and it is decided depending upon the detected value that the catalytic converter is activated. Therefore, it is possible to easily and accurately decide activation of the catalytic converter, and provide accurate decision of the deterioration of the catalytic converter.

The above and further objects and novel features of the invention will more fully appear from the following detailed description when the same is read in connection with the accompanying drawing. It is to be expressly understood, however, that the drawings are for purpose of illustration only and are not intended as a definition of the limits of the invention.

BRIEF DESCRIPTION OF THE DRAWINGS

FIGS. 6(1), 6(2), and 6(3) are waveform diagrams showing a computing operation in the feed back control of air-fuel ratio, performed by the microcomputer of the deterioration detecting apparatus for catalytic converter according to the embodiment 1;

FIGS. 7(1) to 7(4) are waveform diagrams showing air-fuel ratio signal waveforms and catalyst temperatures in case the catalyst is normal and in case the catalyst is deteriorated during the computing operation in the feed back control of air-fuel ratio, performed by the microcomputer of the deterioration detecting apparatus for catalytic converter according to the embodiment 1;

FIGS. 11(1) to 11(6) are waveform diagrams showing several types of signal waveforms during the catalyst activation deciding process in the deterioration detecting apparatus for catalytic converter according to the embodiment 2.

DETAILED DESCRIPTION OF THE PREFERRED EMBODIMENTS

Preferred embodiments of the invention will now be described in detail referring to the accompanying drawings.

Embodiment 1

Figure 2:
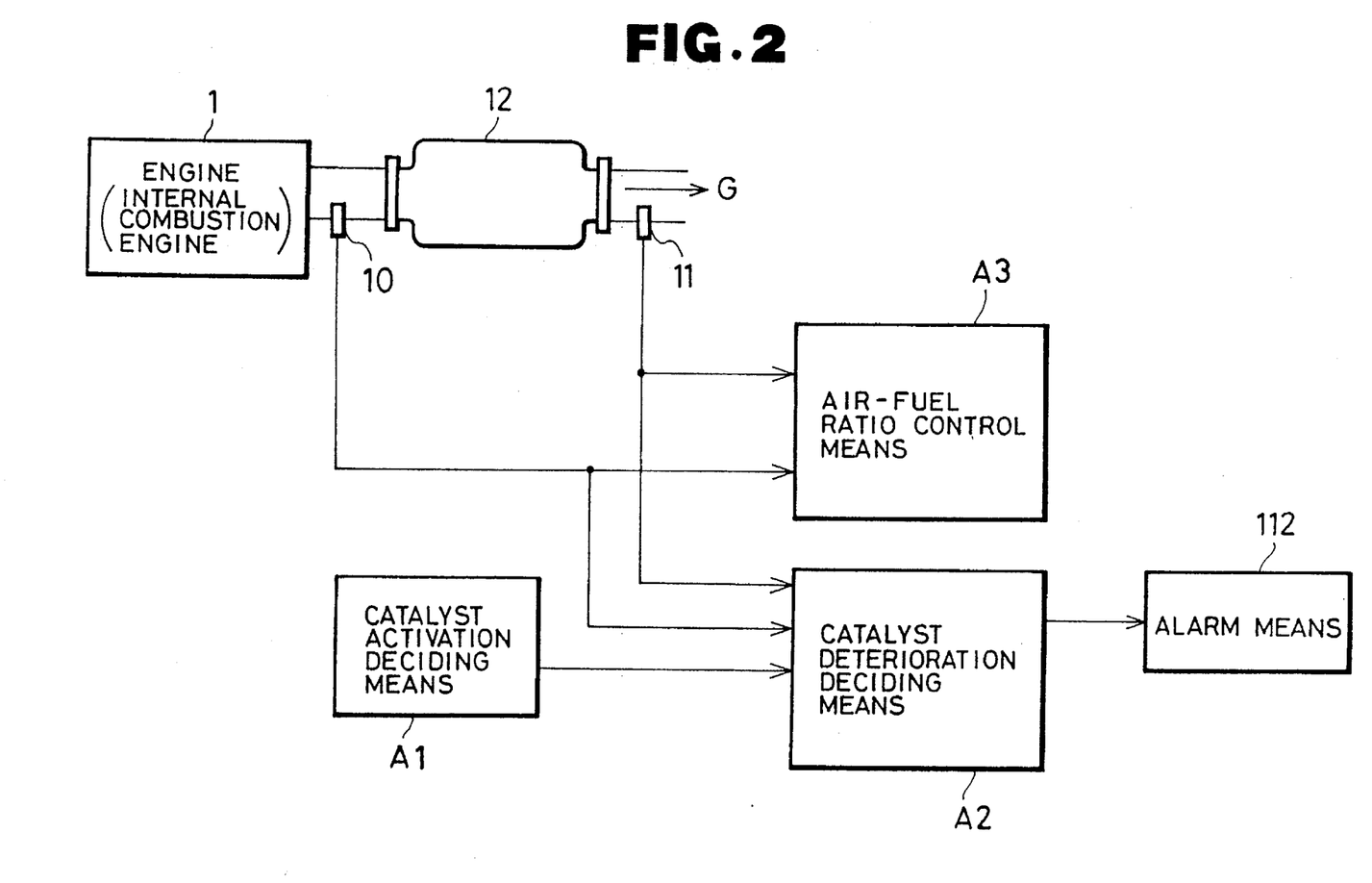
FIG. 2 is a functional block diagram showing a basic structure of a deterioration detecting apparatus for catalytic converter according to the embodiment 1 of the present invention.

FIG. 2 is a functional block diagram showing a basic structure of the first embodiment of the present invention. In the drawing, component parts identical with those in a conventional deterioration detecting apparatus for catalytic converter shown in FIG. 1 are designated by common reference numerals, and descriptions thereof are omitted. In FIG. 2, G designates an exhaust gas exhausted from an engine 1, A1 designates catalyst activation deciding means for deciding whether or not a catalyst in a catalytic converter 12 is activated, A2 designates catalyst deterioration deciding means for deciding deterioration of the catalyst in the catalytic converter 12, and A3 designates air-fuel ratio control means for carrying out control of air-fuel ratio of the engine 1.

A description will now be Given of the operation. The catalytic converter 12 removes injurious ingredients from the exhaust Gas G of the engine 1. Air-fuel ratio sensors 10, 11 detect an oxygen concentration in the exhaust gas G to Generate air-fuel ratio signals $V_1$, $V_2$ which are varied depending upon whether or not an air-fuel ratio in the exhaust Gas G is on the lean side or on the rich side of a theoretical air-fuel ratio. The air-fuel ratio control means A3 carries out the control of air-fuel ratio of the engine 1 depending upon the air-fuel ratio signals $V_1$ and $V_2$. The catalyst activation deciding means A1 decides whether or not the catalytic converter 12 is activated, to output the result to the catalyst deterioration deciding means A2. The catalyst deterioration deciding means A2 decides deterioration of the catalyst depending upon the air-fuel ratio signals $V_1$ and $V_2$ from the air-fuel ratio sensors 10, 11 only when the catalyst activation deciding means A1 decides that the catalytic converter 12 is activated. When the catalyst deterioration deciding means A2 decides that the catalyst of the catalytic converter 12 is deteriorated, the alarm means 112 alerts.

Figure 3:
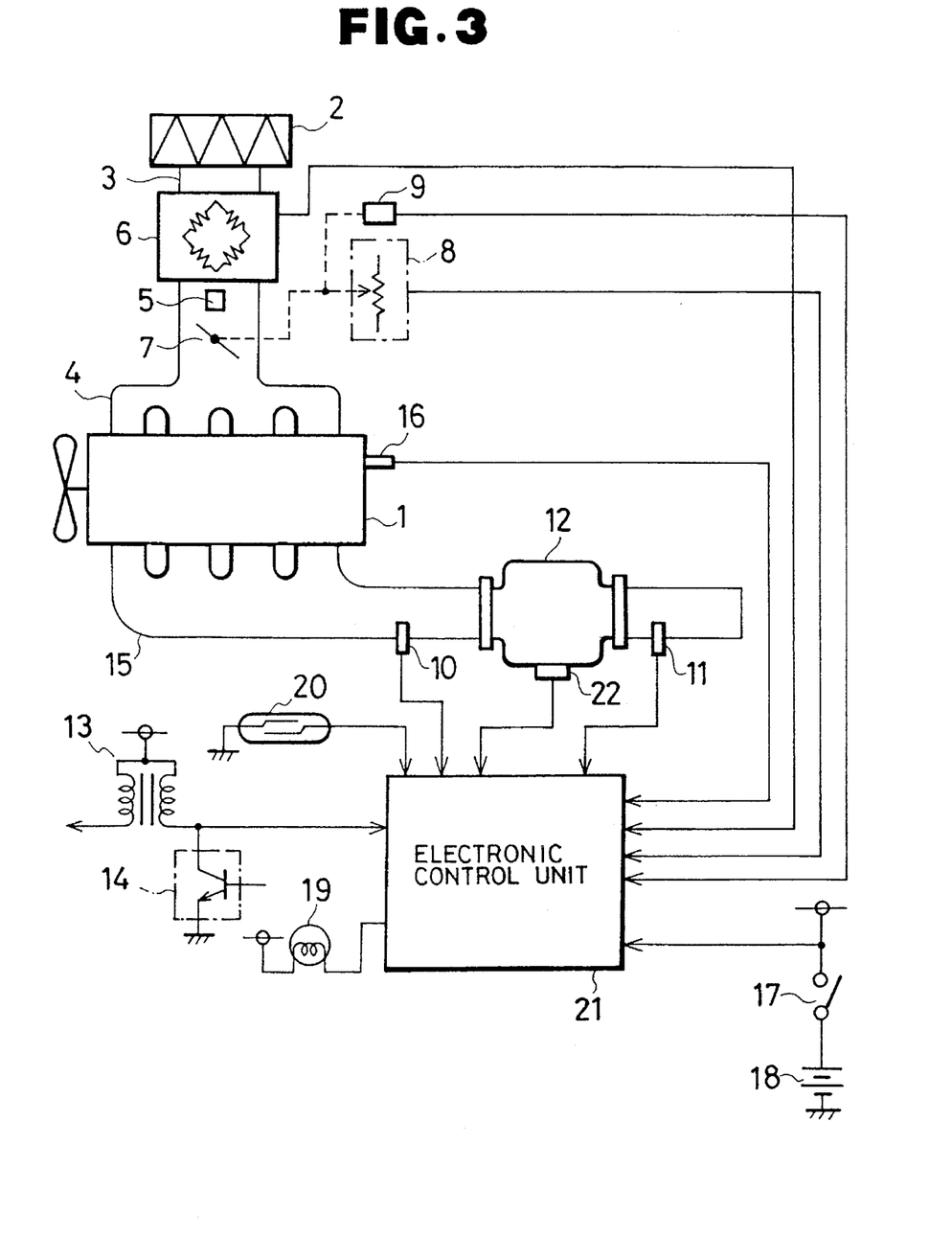
FIG. 3 is a structural diagram showing a hardware structure of the deterioration detecting apparatus for catalytic converter according to the embodiment 1.

A description will now be given of a specific structure in the embodiment. FIG. 3 is a structural diagram showing a hardware structure in the embodiment. In the drawing, component parts identical with those in the conventional deterioration detecting apparatus for catalytic converter shown in FIG. 1 are designated by the common reference numerals, and descriptions thereof are omitted. In FIG. 3, reference numeral 2 means an air cleaner to absorb and remove dust in an intake air, 3 means an intake pipe to supply a mixture to the engine 1, 4 is an intake manifold mounted at a connecting portion between the downstream side of the intake pipe 3 and the engine 1, and 5 is an injector mounted in the upstream of the intake pipe 2 to inject fuel.

Reference numeral 6 means a hot-wire air flow sensor (hereinafter referred to as AFS) for measuring an amount of air sucked into the engine 1 from the intake pipe 3 through the intake manifold 4, and 7 is a throttle valve mounted in the downstream of the injector 5 in the intake pipe 3. Reference numeral 8 means a throttle sensor to detect a throttle divergence of the throttle 7, and 9 is an idle switch which is integrally formed with the throttle sensor 8, and is turned ON by detecting an idling operation state at a time of completely closing the throttle 7.

Reference numeral 13 means an ignition coil including a step-up transformer. The ignition coil is ignited in response to a signal from an igniter 14 to generate and transmit an ignition signal to ECU 21. Reference numeral 14 is the igniter including a power transistor for conducting/cutting off a primary winding of the ignition coil 13. Reference numeral 16 means a thermistor type of water temperature sensor to detect a cooling water temperature T of the engine 1, 18 is a battery serving as a power source, 17 is a key switch to drive the ignition by starting power supply from the buttery 18, and 19 is an alarm lamp which is driven when various abnormalities are detected.

Reference numeral 20 means a vehicle speed sensor to output, as a vehicle speed, a pulse signal having a frequency proportional to a rotational speed of an axle shaft of the vehicle equipped with the engine 1, 21 is an electronic control unit (hereinafter referred to as ECU) to drive/control the injector 5, the alarm lamp 19 and so forth according to various operating states of the vehicle, and 22 is a catalytic temperature sensor to detect a catalyst temperature of the catalytic converter 12. The inputs to the ECU 21 as signals indicating the operating state of the vehicle are an intake air flow rate signal from the AFS 6, a throttle divergence signal from the throttle sensor 8, an idle signal from the idle switch 9, the air-fuel ratio signals $V_1$ and $V_2$ from the respective air-fuel ratio sensors 10, 11, a rotation signal depending upon conduct and cutoff of the ignition coil 13, a cooling water temperature signal from the temperature sensor 16, a vehicle speed signal from the vehicle speed sensor 20, and a catalyst temperature signal from the catalyst temperature sensor 22.

The ECU 21 receives power supply from the buttery 18 by closing the key switch 17, and is functioned to generate an amount of fuel injection to the injector 5 in response to the air-fuel ratio signals $V_1$ and $V_2$, and the operating state so as to carry out feed back control of the air-fuel ratio, and generate an abnormality signal to the alarm lamp 19 when the abnormality occurs. Alternatively, the ignition signal to the igniter 14 may be generated from the ECU 21.

Figure 4:
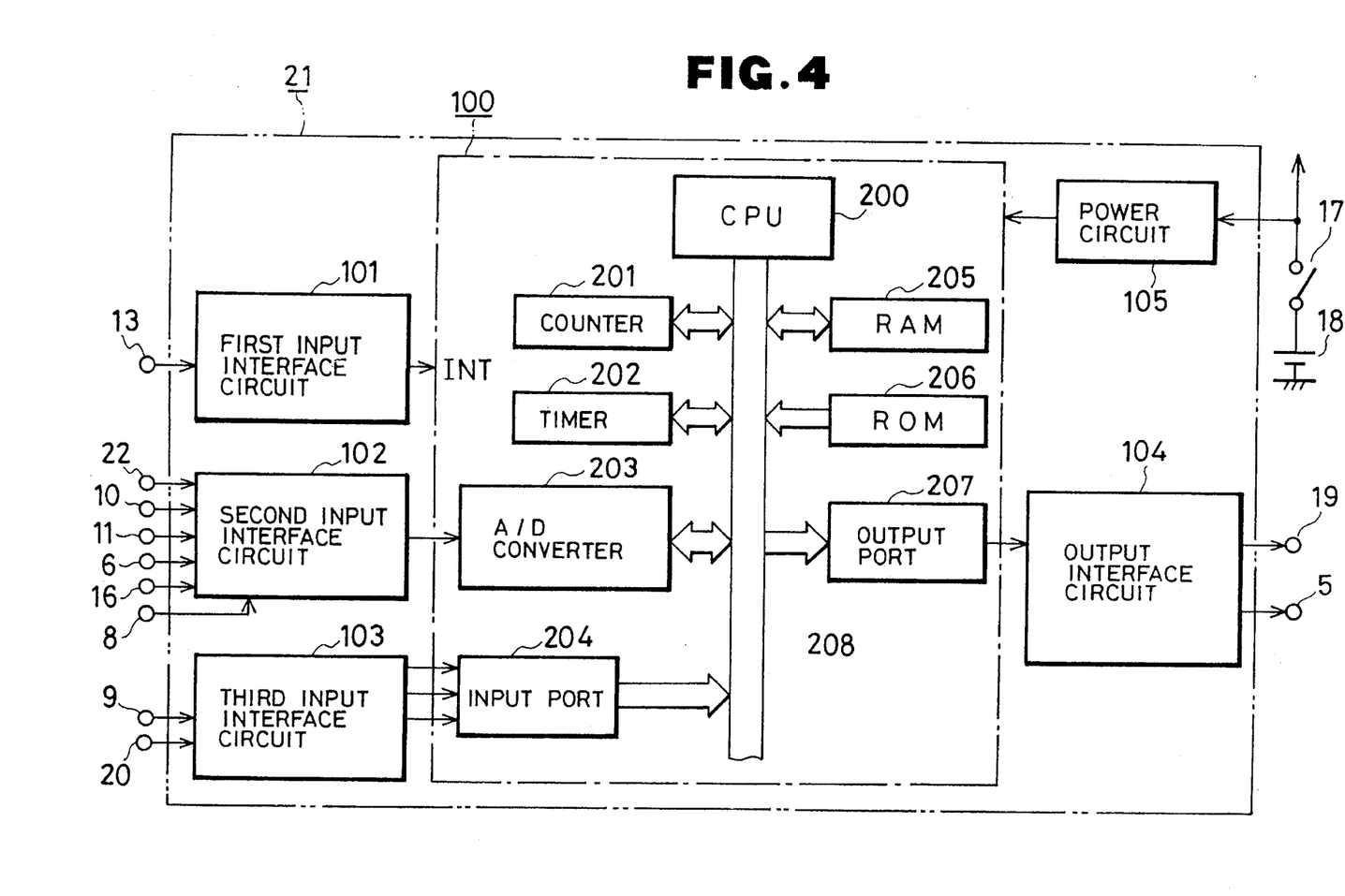
FIG. 4 is a block diagram showing a specific structure of an electronic control unit in the deterioration detecting apparatus for catalytic converter according to the embodiment 1.

FIG. 4 is a block diagram showing a specific structure of the ECU 21. In FIG. 4, reference numeral 100 means a microcomputer, and 101 is a first input interface circuit to perform waveform shaping of the rotation signal outputted from the ignition coil 13 so as to provide an interruption signal INT, and output the interruption signal INT to the microcomputer 100. Reference numeral 102 means a second input interface circuit to take the catalyst temperature signal from the catalyst temperature sensor 22, the air-fuel ratio signals $V_1$, $V_2$ from the air-fuel ratio sensors 10, 11, the intake air flow rate signal from the AFS 6, the water temperature from the temperature sensor 16, and the throttle divergence signal from the throttle sensor 8 so as to provide output to an A/D converter 203 of the microcomputer 100. Reference numeral 103 means a third input interface to take the idle signal from the idle switch 9 and the vehicle speed signal from the vehicle speed sensor 20 to provide output to an input port 204 of the microcomputer 100, and 104 is an output interface circuit to output the abnormality signal, the fuel injection signal J and so forth outputted from an output port 207 of the microcomputer 100 to the alarm lamp 19, and the injector 5. Reference numeral 105 means a power circuit connected to the battery 18 through the key switch 17.

The microcomputer 100 includes a CPU 200 to compute an amount of feed back control of air-fuel ratio (hereinafter briefly referred to as controlled variable of air-fuel ratio) according to the air-fuel ratio signals $V_1$, $V_2$ and the like, a free running counter 201 to measure a rotation period of the engine 1 depending upon the rotation signal from the ignition coil 13, a timer 202 to perform time measuring for various types of control, and the A/D converter 203 to convert an analog signal inputted through the second input interface circuit 102 into a digital signal. Further, the microcomputer 100 includes the input port 204 to take the idle signal inputted through the third interface circuit 103, RAM 205 used as a work memory of the CPU 200, ROM 206 in which an action program of the CPU 200 is stored, the output port 207 to output various types of control signals and the fuel injection signal J through the output interface circuit 104, and a common bus 208 to connect elements 201 to 207 to the CPU 200.

When the interruption signal INT is inputted through the first input interface circuit 101, the CPU 200 reads a value of the counter 201, and concurrently computes the rotation period of the engine 1 depending upon a deviation of a current value and a previous value to store the rotation period in the RAM 205.

Figure 5:
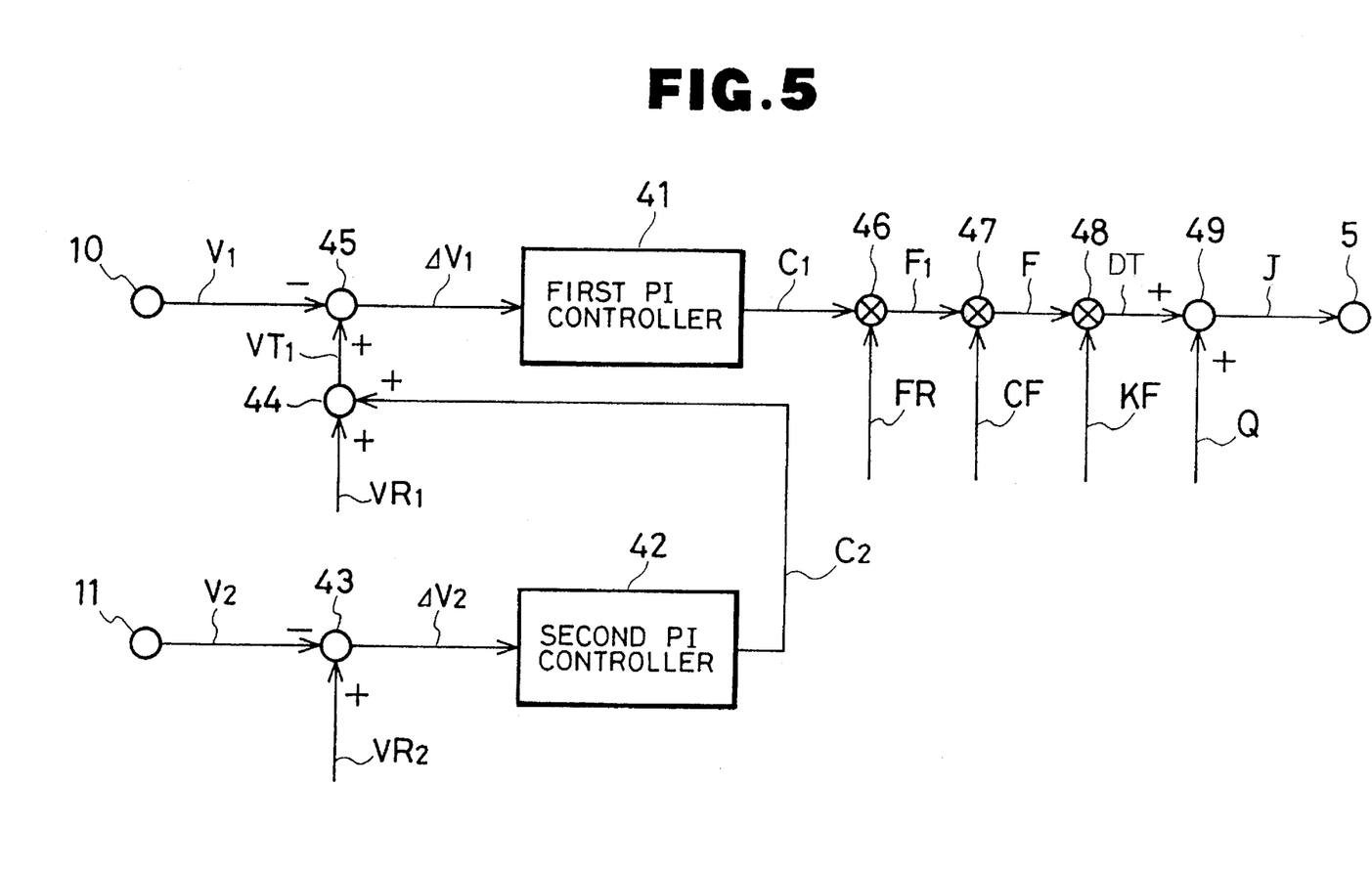
FIG. 5 is a functional block diagram schematically showing a computing operation in feed back control of air-fuel ratio, performed by a microcomputer of the deterioration detecting apparatus for catalytic converter according to the embodiment 1.
Figure 6:
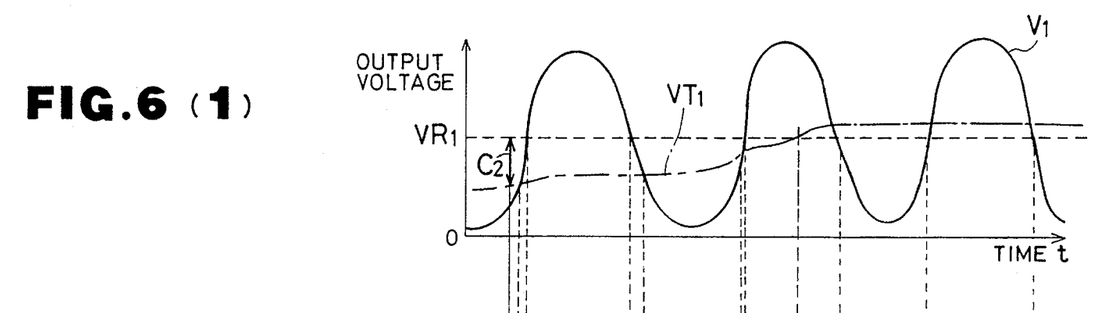
Figure 7:
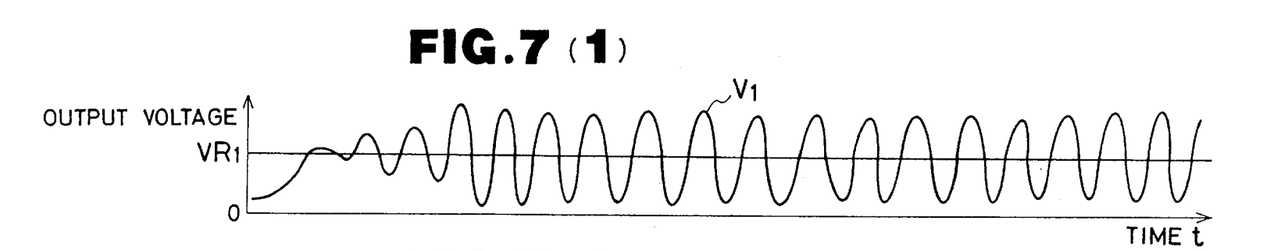

A description will now be given of the operation of the deterioration detecting apparatus for catalytic converter structured as set forth above in the embodiment, with reference to a functional block diagram of FIG. 5, waveform diagrams of FIGS. 6(1) to 6(3) and FIGS. 7(1) to 7(4), and flowcharts of FIGS. 8 and 9.

First, a description will be given of a control method of air-fuel ratio in the embodiment. FIG. 5 is the functional block diagram schematically showing a computing operation in the feed back control of air-fuel ratio, performed by the microcomputer 100. In FIG. 5, reference numeral 41 means a first PI controller to perform PI (proportional integral) control with respect to the air-fuel ratio signal $V_1$ from the first air-fuel ratio sensor 10, and 42 is a second PI controller to perform the PI control with respect to the air-fuel ratio signal $V_2$ from the second air-fuel ratio sensor 11.

The PI controllers 41 and 42 form computing means for computing the controlled variables of air-fuel ratio $C_1$ and $C_2$ depending upon the air-fuel ratio signals $V_1$ and $V_2$, and the second controlled variable of air-fuel ratio $C_2$ serves as an amount of correction with respect to the first controlled variable of air-fuel ratio $C_1$. Further, the first controlled variable of air-fuel ratio $C_1$ corresponds to an amount of correction of air-fuel ratio, thereby performing the feed back control of the final fuel injection signal J with respect to the injector 5 so as to equalize the second air-fuel ratio signal $V_2$ to a second target value $VR_2$.

$VR_1$ and $VR_2$ are first and second target values for control of air-fuel ratio which are preset to the respective air-fuel ratio signals $V_1$ and $V_2$, and are respectively set at voltage values substantially corresponding to the optimal air-fuel ratio of 14.7. However, the second target value $VR_2$ may be set at another voltage value (corresponding to the rich side, that is, an air-fuel ratio smaller than 14.7) slightly higher than that of the first target value $VR_1$.

FR means an amount of basic fuel which is computed depending upon pressure corresponding to an amount of intake air detected by the AFS 6, and CF is an amount of correction of fuel corresponding to acceleration/deceleration states on the basis of the water temperature detected by the water temperature sensor 16 and the throttle divergence detected by the throttle sensor 8. Further, KF means an injecting time correction factor of the injector 5 with respect to an amount of target fuel, and Q is an amount of correction of dead time with respect to a driving time of the injector 5.

Reference numeral 43 means a subtracter to find a deviation $\Delta V_2$ of the second target value $VR_2$ and the air-fuel ratio signal $V_2$ so as to input the deviation into the second PI controller 42, and 44 is an adder to find a correction target value $VT_1$ by adding the second controlled variable of air-fuel ratio $C_2$ to the first target value $VR_1$. Reference numeral 45 means a subtracter to find a deviation $\Delta V_1$ of the correction target value $VT_1$ and the air-fuel ratio signal $V_1$ so as to input the deviation into the first PI controller 41.

The adder 44 forms correcting means for correcting the controlled variable of air-fuel ratio $C_1$ which is computed by the first PI controller 41.

Reference numeral 46 means a multiplier to generate an amount of target fuel $F_1$ by multiplying the controlled variable of air-fuel ratio $C_1$ from the first PI controller 41 by the amount of basic fuel FR, and 47 is a multiplier to generate an amount of correction of fuel F by multiplying the amount of target fuel $F_1$ by the amount of correction of fuel CF. Reference numeral 48 means a multiplier to generate a driving time DI of the injector 5 by multiplying the amount of correction of fuel F by the injecting time correction factor KF, and 49 is an adder to generate the final fuel injection signal J with respect to the injector 5 by adding the amount of correction of dead time Q to the driving time DI. These multipliers 46 to 48 and the adder 49 form controlled variable converting means for converting the controlled variable of air-fuel ratio $C_1$ into the fuel injection signal J.

A description will now be given of a specific control action of air-fuel ratio in the embodiment referring to waveform diagrams of FIGS. 6(1) to 6(3).

As shown in FIG. 6(2), the subtracter 43 generates the deviation $\Delta V_2$ ($=V_2-VR_2$) by comparing the second air-fuel ratio signal $V_2$ from the air-fuel ratio sensor 11 mounted in the downstream of the catalytic converter 12, and the second target value $VR_2$. Further, the second PI controller 42 computes the controlled variable of air-fuel ratio $C_2$ by performing PI control of the deviation $\Delta V_2$.

On the other hand, as shown in FIG. 6(1), the adder 44 adds the controlled variable of air-fuel ratio $C_2$, that is, an amount of correction to the first target value $VR_1$ so as to generate the correction target value $VT_1$ ($=VR_1+C_2$) with respect to the first air-fuel ratio sensor 11. Further, as shown in FIG. 6(3), the subtracter 45 generates the deviation $\Delta V_1$ ($=VT_1-V_1$) by comparing the first air-fuel ratio signal $V_1$ on the upstream side of a catalyst 10 and the correction target value $VT_1$. The first PI controller 41 computes the controlled variable of air-fuel ratio $C_1$ for feed back by performing PI control of the deviation $\Delta V_1$.

Thus, the controlled variable of air-fuel ratio $C_1$ depending upon the first air-fuel ratio signal $V_1$ is varied from a state shown by the broken line in FIG. 6(3) in which no correction is performed by the deviation $\Delta V_2$, to another state shown by the solid line in FIG. 6(3) in which the correction is performed by the deviation $\Delta V_2$, i.e., the second controlled variable of air-fuel ratio $C_2$, resulting in the final controlled variable of air-fuel ratio.

Next, the amount of basic fuel FR is computed depending upon the amount of intake air detected by the AFS 6, and the multiplier 46 finds the amount of target fuel $F_1$ by multiplying the amount of basic fuel FR by the controlled variable of air-fuel ratio $C_1$.

Subsequently, an amount of correction corresponding to a warming state of the engine 1 is computed depending upon the water temperature from the water temperature sensor 16. Further, the acceleration/deceleration states are detected depending upon the amount of correction and the throttle divergence from the throttle sensor 8, and the amount of correction of fuel CF is computed depending upon, for example, an amount of correction corresponding to the acceleration/deceleration states. Then, the multiplier 47 finds the amount of correction of fuel F corresponding to the final amount of fuel injection by multiplying the amount of target fuel $F_1$ by the amount of correction of fuel CF.

In addition, the multiplier 48 finds the driving time DI of the injector 5 by multiplying the injecting time correction factor KF by the amount of correction of fuel F, and the adder 49 finds the final fuel injection signal J with respect to the injector 5 by adding the amount of correction of dead time Q to the driving time DI.

As set forth above, the air-fuel ratio signal $V_2$ from the second air-fuel ratio sensor 11 is used to correct the target value $VR_1$ with respect to the first air-fuel ratio sensor 10, and the feed back control of air-fuel ratio is performed such that the air-fuel ratio signal $V_2$ in the downstream of the catalytic converter 12 becomes the second target value $VR_2$.

That is, when the air-fuel ratio signal $V_2$ in the downstream of the catalytic converter 12 shows the lean side (i.e., the air-fuel ratio being larger than 14.7), the fuel injection signal J is set to be longer, and the air-fuel ratio is set on the rich side. Otherwise, when the air-fuel ratio signal $V_2$ in the downstream of the catalytic converter 12 shows the rich side (i.e., the air-fuel ratio is smaller than 14.7), the fuel injection signal J is set to be shorter, and the air-fuel ratio is set on the lean side.

In this case, deterioration of the catalytic converter 12 results in a variation in the air-fuel ratio signal $V_2$ serving as output voltage of the second air-fuel ratio sensor 11. FIGS. 7(1) to 7(4) show the variation.

FIG. 7(1) shows a waveform of the air-fuel ratio signal $V_1$ serving as output voltage of the first air-fuel ratio sensor 10 in a state where the engine 1 is constantly operated. FIG. 7(2) shows the air-fuel ratio signal $V_2$ from the second air-fuel ratio sensor 11 in case the catalyst in the catalytic converter 12 is normal. FIG. 7(3) shows a waveform of the air-fuel ratio signal $V_2$ in case the catalyst is deteriorated, and FIG. 7(4) shows a catalyst temperature $T_C$ of the catalytic converter 12 during the constant operation of the engine 1.

In FIG. 7(4), $T_{C1}$ is an activation temperature which can provide efficient oxidation/reduction of the catalyst in the catalytic converter 12. As seen from FIG. 7(2), during a period $t_0$ in which the catalyst has a temperature of the activation temperature $T_{C1}$ or more, the air-fuel ratio signal $V_2$ can have a substantially constant voltage value because of purifying action of the catalyst in case the catalyst is normal. As seen from FIG. 7(3), since the purifying action of the catalyst is reduced when the catalyst is deteriorated, an output waveform is sine wave-shaped as in the case of the air-fuel ratio signal $V_1$ in FIG. 7(1). Then, it is possible to detect deterioration of the catalyst in the catalytic converter 12 by using the variation in the waveform of the air-fuel ratio signal $V_2$.

However, as shown in FIGS. 7(2) to 7(4), when the catalyst temperature $T_C$ is lower than the activation temperature $T_{C1}$, that is, the catalyst can not provide the efficient oxidation/reduction, the air-fuel ratio signal $V_2$ shows the same waveform as that at a time of catalyst deterioration even if the catalyst is not deteriorated. Consequently, when deterioration of the catalyst is decided depending upon the waveform of the air-fuel ratio signal $V_2$, the deterioration of the catalyst is erroneously detected though the catalyst is not deteriorated. Thus, in the embodiment, the deterioration of the catalyst is decided only when the temperature of the catalyst becomes the activation temperature $T_{C1}$ or more.

Figure 8:
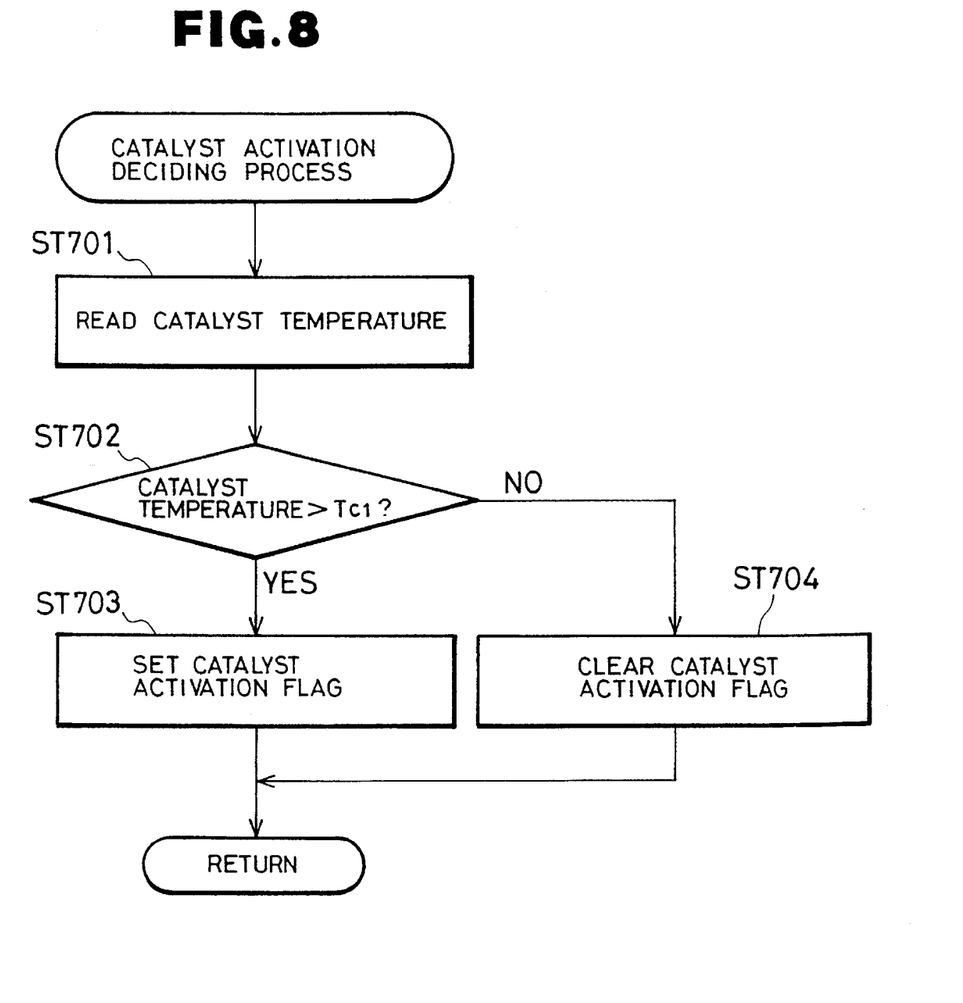
FIG. 8 is a flowchart showing a catalyst activation deciding process in the deterioration detecting apparatus for catalytic converter according to the embodiment 1.
Figure 9:
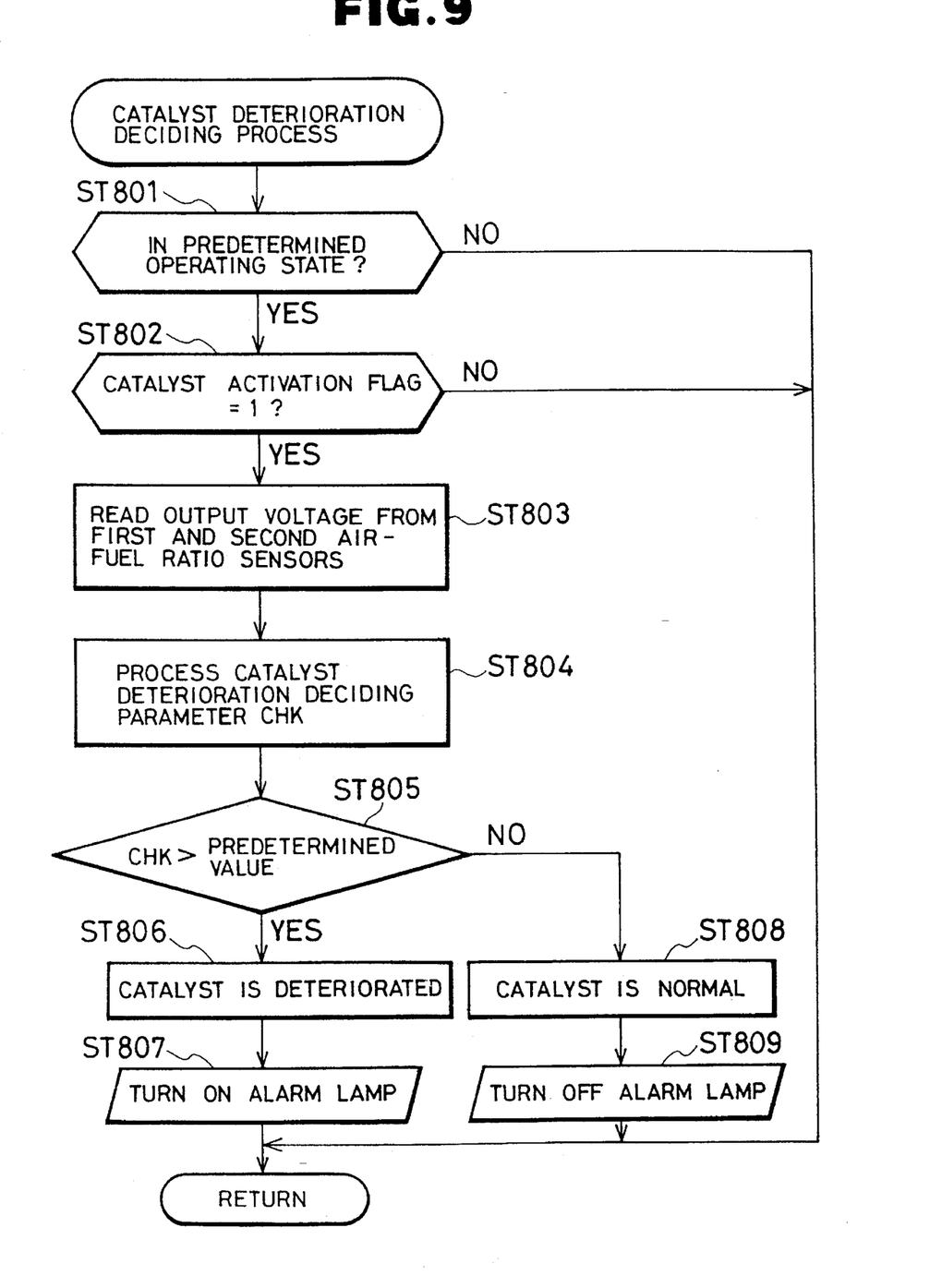
FIG. 9 is a flowchart showing a catalyst activation deciding process in the deterioration detecting apparatus for catalytic converter according to the embodiment 1.

FIG. 8 is a flowchart showing a catalyst activation deciding process. In FIG. 8, the microcomputer 100 reads the catalyst temperature $T_C$ from the catalyst temperature sensor 22 through the second input interface circuit 102 (in Step ST701). The read catalyst temperature $T_C$ is compared with the activation temperature $T_{C1}$ stored in the ROM 206 (in Step ST702). When the catalyst temperature $T_C$ is higher than the activation temperature $T_{C1}$, it is decided that the catalyst is activated, thereafter setting a catalyst activation flag to one (in Step ST703), and the catalyst activation deciding process is ended. Otherwise, when the catalyst temperature $T_C$ is lower than the activation temperature $T_{C1}$, it is decided that the catalyst is not activated, thereafter setting the catalyst activation flag to zero (in Step ST704), and the catalyst activation deciding process is ended.

Next, a description will now be given of the catalyst deterioration deciding process in the embodiment referring to a flowchart of FIG. 9. In order to perform the catalyst deterioration deciding process, the microcomputer 100 decides whether or not the engine 1 is operated in a predetermined operating state (in Step ST801). The predetermined operating state means a state suitable for deciding deterioration of the catalytic converter, that is, a steady state of the engine 1 except an idling state, or acceleration/deceleration states. Further, the decision is made depending upon signals indicating the operating state, such as the intake air flow rate signal, the throttle divergence signal, the idle signal, the rotation signal, the cooling water temperature signal, the vehicle speed signal which are inputted into the ECU 21. As a result of the decision, if the engine 1 is not in the predetermined operating state, the catalyst deterioration deciding process is ended.

Otherwise, if the engine 1 is in the predetermined operating state, in the microcomputer 100, the operation proceeds to Step ST802 where it is decided whether or not the catalyst activation flag is one. If the catalyst activation flag is not one, the catalyst deterioration deciding process is ended. Since the catalyst is activated if the catalyst activation flag is one, the microcomputer 100 reads the air-fuel ratio signals $V_1$ and $V_2$ serving as output voltage from the first and second air-fuel ratio sensors 10 and 11 to decide the catalyst activation (in Step ST803).

Subsequently, the microcomputer 100 processes a catalyst deterioration deciding parameter CHK depending upon the read air-fuel ratio signals $V_1$ and $V_2$ (in Step ST804). In the process, for each of the air-fuel ratio signals $V_1$ and $V_2$, the microcomputer 100 finds area corresponding values S graphically defined by the air-fuel ratio signal and a predetermined voltage value, and a period Tt with which the air-fuel ratio signal is inverted with respect to the predetermined voltage value. An area corresponding value Sf and an inversion period Ttf are found for the air-fuel ratio signal $V_1$, and an area corresponding value Sr and an inversion period Ttf are found for the air-fuel ratio signal $V_2$. Thus, the catalyst deterioration deciding parameter CHK is computed as follows:

CHK=(Sr/Ttr)/(Sf/Ttf)

This expression can provide ratios of the area corresponding values to the inversion periods.

A predetermined value is compared with the catalyst deterioration deciding parameter CHK obtained as described above (in Step ST805). In case the catalyst deterioration deciding parameter CHK is greater than the predetermined value, as shown in FIG. 7(3), the voltage value of the second air-fuel ratio signal $V_2$ is varied in a wide range for a short period, and a ratio of variation in the first air-fuel ratio signal $V_1$ to the variation in the second air-fuel ratio signal $V_2$ is greater than the predetermined value. In this case, in the microcomputer 100, it is decided that the catalyst in the catalytic converter 12 is deteriorated (in Step ST806), and the alarm lamp 19 is turned ON (in Step ST807) to alert a driver to the deterioration of the catalyst, resulting in end of the catalyst deterioration deciding process. Alternatively, in case the catalyst deterioration deciding parameter CHK is smaller than the predetermined value, the second air-fuel ratio signal $V_2$ is varied in a small range, and the ratio of the variation in the first air-fuel ratio signal $V_1$ to the variation in the second air-fuel ratio signal $V_2$ is smaller than the predetermined value. In this case, in the microcomputer 100, it is decided that the catalyst is normal (in Step ST808), and the alarm lamp 19 is turned OFF when the alarm lamp is ON (in Step ST809) or is left when OFF, resulting in end of the catalyst deterioration deciding process. In the above process, the deterioration of the catalytic converter 12 is decided only when the catalyst is activated.

In embodiment, the catalyst deterioration deciding parameter CHK is found depending upon the first and second air-fuel ratio signals $V_1$ and $V_2$. However, the catalyst deterioration deciding parameter CHK may be found depending upon only the second air-fuel ratio signal $V_2$. Alternatively, the predetermined value which is compared with the catalyst deterioration deciding parameter CHK may be varied according to the operating state of the engine 1.

Embodiment 2

A description will now be given of the embodiment 2 of the present invention. Since the embodiment 2 employs the same hardware structure as that in the embodiment 1 shown in FIGS. 3 and 4, a description thereof is omitted. Further, the embodiment 2 shows the same control action of air-fuel ratio as that in the embodiment 1 described with reference to a functional block diagram of FIG. 5, and waveform diagrams of FIG. 6(1) to 6(3). Therefore, a description thereof is also omitted.

Figure 10:
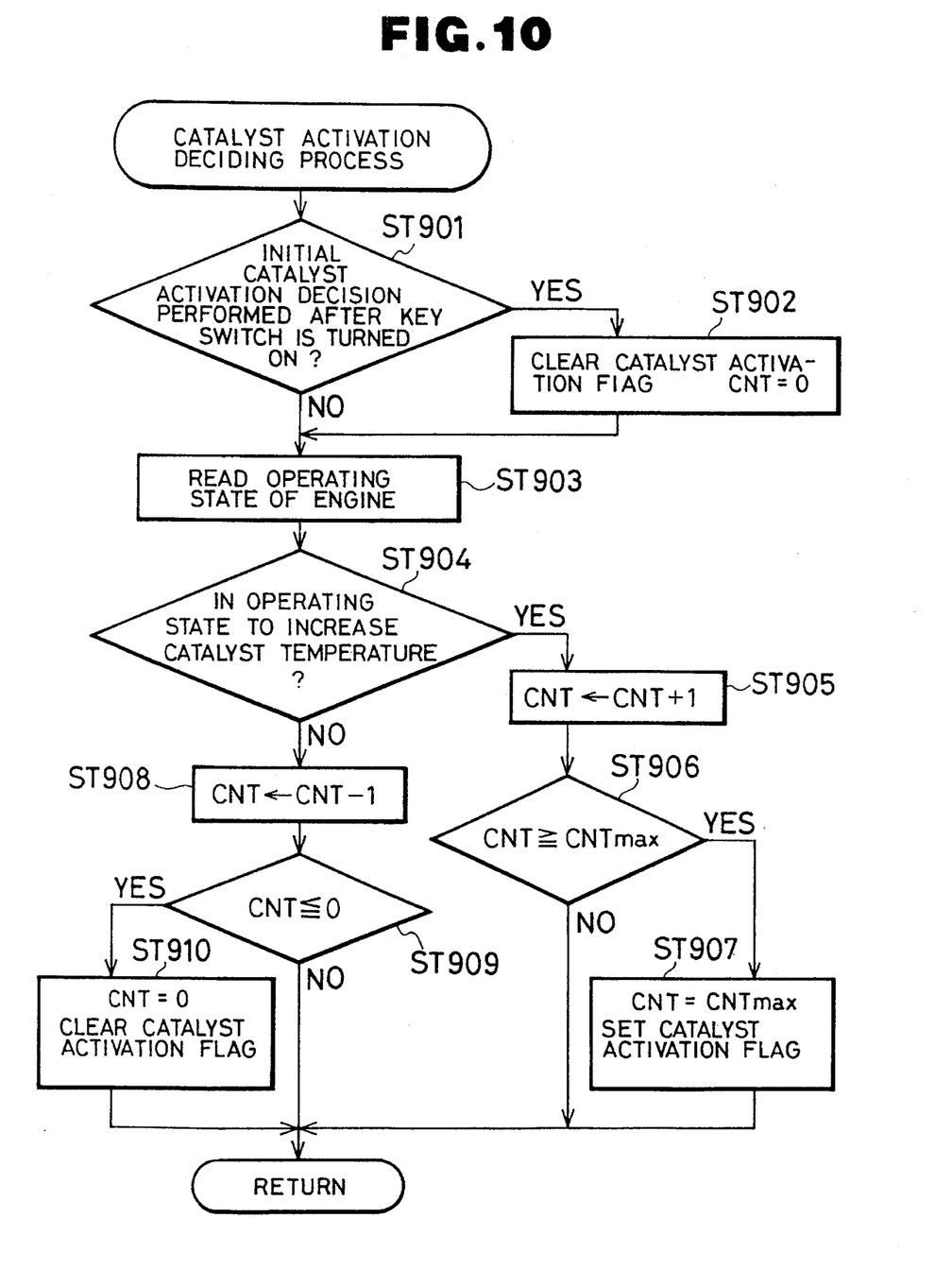
FIG. 10 is a flowchart showing a catalyst activation deciding process in a deterioration detecting apparatus for catalytic converter according to the embodiment 2.
Figure 11:
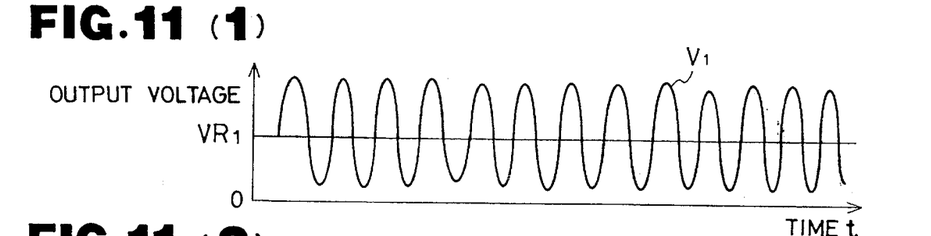

A description will now be given of a catalyst activation deciding process in the embodiment referring to a flowchart of FIG. 10 and waveform diagrams of FIGS. 11(1) to 11(6).

In the microcomputer 100, it is decided whether or not the catalyst activation deciding process is an initial catalyst activation deciding process carried out after a key switch 17 is turned ON (in Step ST901). In case of the initial catalyst activation deciding process, a catalyst activation flag is set to zero, and a counting value (hereinafter referred to as CNT) in a counter 201 is set to zero (in Step ST902). The operation proceeds to Step ST903. Otherwise, if not the initial catalyst activation deciding process, the operation proceeds to Step ST903 with no processing.

In Step ST903, the microcomputer 100 reads signals indicating an operating state of an engine 1, such as an intake air flow rate signal, a throttle divergence signal, an idle signal, a rotation signal, a cooling water temperature signal, a vehicle speed signal. Next, in the microcomputer 100, it is decided depending upon the read signals whether or not the engine 1 is in an operating state to increase a catalyst temperature $T_C$ of a catalytic converter 12 (in Step ST904). As shown in FIG. 11(4), the decision is made depending upon, for example, whether an amount of intake air $Q_a$ of the engine 1 is greater or less than a predetermined amount of intake air $Q_{a1}$. That is, when the amount of intake air $Q_a$ is greater than the amount of intake air $Q_{a1}$, it is decided that the engine 1 is in the operating state to increase the catalyst temperature $T_C$.

In case of the operating state to increase the catalyst temperature $T_C$, the counting value CNT is increased by one (in Step ST905), and the max counting value $CNT_{max}$ is compared with a current counting value CNT when the catalyst temperature $T_C$ increases to a catalyst activation state, that is, to become an activation temperature $T_{C1}$ (in Step ST906). As a result of the comparison, when the counting value CNT is equal to or more than the max counting value $CNT_{max}$, the catalyst activation flag is set to one while the counting value CNT is kept to be the max counting value $CNT_{max}$ (in Step ST907). Otherwise, as a result of the comparison in Step ST906, when the counting value CNT is smaller than the max counting value $CNT_{max}$, the catalyst activation deciding process is ended with no processing. As shown in FIG. 11(5), the state where the counting value CNT is smaller than the max counting value $CNT_{max}$ means that the engine 1 is in the operating state to increase the catalyst temperature $T_C$ of the catalytic converter 12 (i.e., for a period $t_a$ in FIG. 11(4)), but the counting value CNT of the counter 201 does not reach the max counting value $CNT_{max}$ yet, and a catalyst in the catalytic converter 12 is not sufficiently heated to reach the activation temperature $T_{C1}$ to activate the catalyst. Further, as shown in FIGS. 11(5) and 11(6), the state where the counting value CNT is equal to or more than the max counting value $CNT_{max}$ means that the catalyst temperature $T_C$ is equal to or more than the activation temperature $T_{C1}$ after an activation time point $t_1$. Therefore, in this case, it is indicated that the catalyst is activated by setting the catalyst activation flag to one, and the counting value CNT is kept to be the max counting value $CNT_{max}$ as shown in FIG. 11(5).

In the decision in Step ST904, when it is decided that the engine 1 is not in the operating state to increase the catalyst temperature $T_C$, the counting value CNT of the counter 201 is decreased by one (in Step ST908), and it is subsequently decided whether or not the decreased counting value CNT is less than zero, that is, whether the decreased counting value CNT is zero or negative (in Step ST909). In case the counting value CNT is zero or negative, the counting value CNT is set to zero, and the catalyst activation flag is set to zero (in Step ST910), resulting in end the catalyst activation deciding process. In case the counting value CNT is positive, the catalyst activation deciding process is ended with no processing. The decision that the engine 1 is not in the operating state to increase the catalyst temperature $T_C$ means that the engine 1 is in the operating state where the amount of intake air of the engine 1 is less than an amount of intake air $Q_{a1}$ in FIG. 11(4). Further, the fact that the counting value CNT is positive means that the catalyst temperature $T_C$ is higher than the activation temperature $T_{C1}$, and that the catalyst is activated and is in a period $t_b$ where the catalyst temperature $T_C$ is decreasing, for a period $t_0$ under the activation state as seen from FIGS. 11(5) and 11(6). Therefore, in this case, the catalyst activation deciding process is ended while the catalyst activation flag remains one. The decision that the engine 1 is not in the operating state to increase the catalyst temperature $T_C$ and the counting value CNT is zero or negative means that the catalytic converter 12 is in one state before the period $t_0$ of FIG. 11(4) or in the other state after a time $t_2$ of FIG. 11(5) as seen from FIG. 11(5). Thus, in this case, the counting value CNT of the counter 201 is set to zero, and the catalyst activation flag is set to zero, resulting in an indication that the catalytic converter 12 is not activated.

In the embodiment, though the amount of intake air $Q_a$ is used to decide the operating state of the engine 1, it must be noted that the present invention should not be limited to this, and an increase in the temperature of the catalytic converter 12 may be decided by combining an engine speed signal, an intake air pipe pressure signal, the cooling water temperature signal, the vehicle speed signal and the like as signals for deciding the operating state. Further, an increase/decrease in the counting value CNT of the counter 201 may be decided by adding processing for discretely setting an increase condition of the counting value CNT, and a decrease condition of the counting value CNT, or discretely setting an amount of increase/decrease in the counting value CNT. It is thereby possible to carry out more accurate catalyst activation decision.

As set forth above, according to the first aspect of the present invention, the catalyst activation deciding means decides whether or not the catalyst in the catalytic converter is activated, and deterioration of the catalyst is decided by the catalyst deterioration deciding means only when the catalyst is activated. As a result, it is possible to avoid erroneous decision caused when the catalyst deterioration is decided in the state where the catalyst temperature is less than a temperature to provide oxidation/reduction reaction. As a result, there is an effect in that the deterioration of the catalytic converter can be decided with high-accuracy.

Further, according to the second aspect of the present invention, the temperature detecting means detects the temperature of the catalytic converter, and when the temperature of the catalytic converter falls in the predetermined range, it is decided that the catalytic converter is activated. As a result, activation of the catalytic converter can easily and accurately be decided, and the deterioration of the catalytic converter can be decided with high-accuracy.

Further, according to the third aspect of the present invention, the operating state detecting means detects the operating state to decide the activation of the catalytic converter depending upon the detected value. As a result, activation of the catalytic converter can easily and accurately be decided, and the deterioration of the catalytic converter can be decided with high-accuracy.

While preferred embodiments of the invention have been described using specific terms, such description is for illustrative purposes only, and it is to be understood that changes and variations may be made without departing from the spirit or scope of the following claims.

What is claimed is:

1. A deterioration detecting apparatus for catalytic converter comprising:

catalyst activation deciding means for deciding whether a catalyst is activated in a catalytic converter;

a steady state operation determining means, distinct from said catalyst activation deciding means, for determining a steady state operation of said internal combustion engine;

a catalyst deterioration deciding means for deciding deterioration of said catalyst only when said catalyst activation deciding means decides that said catalyst is activated and when said steady state deciding means decides that said engine is in a steady state operation; and operating state detecting means for detecting an operating state of said internal combustion engine, wherein said catalyst activation deciding means decides that said catalyst is activated during a period starting after elapse of a first time count in which an output value from said operating state detecting means is kept in a predetermined range, and ending upon the elapse of a second time count commencing after said output value is out of said predetermined range.

2. A deterioration detecting apparatus for catalytic converter according to claim 1, wherein said predetermined range is varied according to the operating state of said internal combustion engine.

3. A deterioration detecting apparatus for catalytic converter according to claim 1, wherein said operating state detecting means is a hot-wire air flow sensor.

4. A deterioration detecting apparatus for catalytic converter according to claim 1, wherein said operating state detecting means is an ignition coil.

5. A deterioration detecting apparatus for catalytic converter according to claim 1, wherein said operating state detecting means is an igniter.

6. A deterioration detecting apparatus for catalytic converter according to claim 1, wherein said operating state detecting means is a water temperature sensor.

7. A deterioration detecting apparatus for catalytic converter according to claim 1, wherein said operating state detecting means is a vehicle speed sensor.

8. A deterioration detecting apparatus for catalytic converter according to claim 1, wherein said operating state detecting means is an intake air flow rate sensor.

* * * * *